(12) United States Patent
Agostinelli et al.

(10) Patent No.: US 6,168,103 B1
(45) Date of Patent: Jan. 2, 2001

(54) APPARATUS FOR PROCESSING RUBBER-BASED MATERIALS

(75) Inventors: Sanzio Agostinelli, 5 Chemin du Bessy, F-42150 LaRicamarie; Daniel Dasilva, Vielle Brioude, F-43100 Brioude, both of (FR)

(73) Assignees: Sanzio Agostinelli; Daniel DaSilva; Bruno Perrin; Daniel Perrin, all of (FR)

( * ) Notice: Under 35 U.S.C. 154(b), the term of this patent shall be extended for 0 days.

(21) Appl. No.: 09/051,681

(22) PCT Filed: Oct. 24, 1995

(86) PCT No.: PCT/FR95/01408

§ 371 Date: Apr. 16, 1998

§ 102(e) Date: Apr. 16, 1998

(87) PCT Pub. No.: WO97/15397

PCT Pub. Date: May 1, 1997

(51) Int. Cl.⁷ .................................................. B02C 19/12
(52) U.S. Cl. .................................... 241/159; 241/DIG. 31
(58) Field of Search ............................ 241/DIG. 31, 159

(56) References Cited

U.S. PATENT DOCUMENTS

| 264,055 | * | 12/1882 | Angell | 241/159 |
| 5,234,171 | * | 8/1993 | Fantacci | 241/DIG. 31 |

FOREIGN PATENT DOCUMENTS

| 8901786 | 4/1989 | (DE) . |
| 3830959 | 3/1990 | (DE) . |
| 0567759 | 11/1993 | (EP) . |
| WO93/13858 | 7/1993 | (WO) . |
| 9407670 | 4/1994 | (WO) . |

* cited by examiner

Primary Examiner—Mark Rosenbaum
(74) Attorney, Agent, or Firm—Wall Marjama & Bilinski

(57) ABSTRACT

An apparatus for processing articles such as types that include a metal reinforcement embedded in a rubber-based material. The apparatus continuously and sequentially disintegrates the rubber-based material in order to separate it from the metal reinforcement and forms a powder consisting of a mixture of rubber and metal or fabric particles.

6 Claims, 5 Drawing Sheets

APPARATUS FOR PROCESSING RUBBER-BASED MATERIALS

The invention relates especially to the technical field of recovering waste rubber, particularly any type of rubbery or plastic material that has integral, generally metal, strengthening reinforcement. Advantageously, the invention has an especially advantageous application for the processing of tires but this does not exclude other applications, including the processing of certain electric cables.

It is known that the storage, transport and recycling of used tires of light vehicles or heavy goods type vehicles pose genuine problems.

Many systems have been suggested to allow the recycling or treatment of tires with a view to various applications including fuels. After processing, the tires may also be used for certain road equipment.

Generally speaking, the tires are subjected to operations capable of reducing them to a certain particle size and, if applicable, separating metal and/or textile reinforcement from the rubbery material.

Apparatus of the crusher type is generally used to achieve this result. This state of the art is illustrated by the facts disclosed in Patents FR 2 377 271, FR 2 419 110, FR 2 451 819, EP 0 334 387 and EP 0 434 975. These various techniques use cutting tools in order to initially chop the tire into pieces.

This solution is unsatisfactory because the pieces obtained still contain the metal reinforcement. Problems therefore occur when such pieces are incinerated, given the fact that they contain steel. In addition, the metal reinforcement quickly damages the cutting tools.

European Patent 0 561 285 discloses a system for processing tires by destructive means without previously removing metal components by using cutting tools specially designed to exhibit practically zero wear.

Separating the rubber from the metal reinforcement requires an additional system which is relatively complex in terms of the facilities it uses. All known systems are extremely large and require special infrastructure which makes it impossible to process tires in situ. It is generally necessary to transport the tires to the site of the system because it is a static plant.

This transport consequently increases the cost of processing tires.

One should also mention Patent WO-A-9313858 which describes a device for size reduction of tire casings based on crushing the articles to be processed and then passing them between pressure rollers. This device has rollers that cooperate with a means of reaction consisting either of a fixed plate or another cylindrical roller. The system works by crushing so that it is necessary to delimit the compression area. For this purpose, the rollers have shoulders that match up with the means of reaction.

In a preferred form, this device uses two rollers, thus making it possible to avoid the occurrence of stresses inside the material to be processed. As a result, the processing principle relies exclusively on high compression and the existence of friction associated with high pressure causes an unacceptable temperature increase in the material to be processed.

German Utility Model DE-U-8901786 also discloses a machine for processing used tires by means of two rollers having different linear velocities. However, it appears that the use of two rollers only produces shear forces over a small area of the tires and this makes it impossible to obtain effective cohesion.

The invention set itself the goal of overcoming these drawbacks in a simple, reliable, effective and efficient manner.

The problem which the invention aims to solve is to separate the rubbery material from any type of reinforcement or strengthening of any kind, whether metallic and/or textile, in any product, especially a tire, without making use of cutting tools and by using the actual metal reinforcement as a means of cutting.

Another problem which the invention aims to solve is to process articles of tire and other types at any location, for instance in situ where they are produced or stored, in contrast to static installations.

In order to solve such a problem, an apparatus has been designed and perfected of the type comprising at least two rows of rotating rollers with parallel centerlines which are superposed two by two, the articles being fed in flat between said rollers that are capable of continuously and successively ensuring loss of cohesion of the rubbery material with a view to separating it from the metal reinforcement in order to produce a resulting powder which is a mixture of rubber and metal or textile particles characterised in that the rollers in the first row are positively driven in the same direction of rotation at different linear velocities whereas the rollers in the other row rotate in the other direction in order to transport the articles by friction.

The problem of ensuring loss of cohesion of the rubbery material and separation of the metal reinforcement is solved in that the rollers are designed and/or controlled by means to exert pressure on the tire to be processed combined with frictional movement due to relative displacement between said tire and said rollers.

Advantageously, said rollers form three separate, continuous areas which each correspond to one function, namely:

primary loss of cohesion of the rubbery material in order to detach it from the metal reinforcement, stripping of the rubbery material from the metal reinforcement, separation of the rubbery material and the metal reinforcement in order to obtain a powder.

In order to achieve this result, the rollers are driven at the same angular velocity and are, in each area, of different diameter.

The rollers are devised to be driven simultaneously in rotation by means of one or more motors in combination or not in combination with a device of the inertia flywheel type in order to subject the tire to a pressure force during an extremely short time interval.

Given the design of the apparatus, it may have various geometrical shapes. For this purpose, the roller areas either have a linear, superposed or side-by-side configuration.

The invention is explained below in more detail, reference being made to the accompanying drawings in which.

Figure 1:
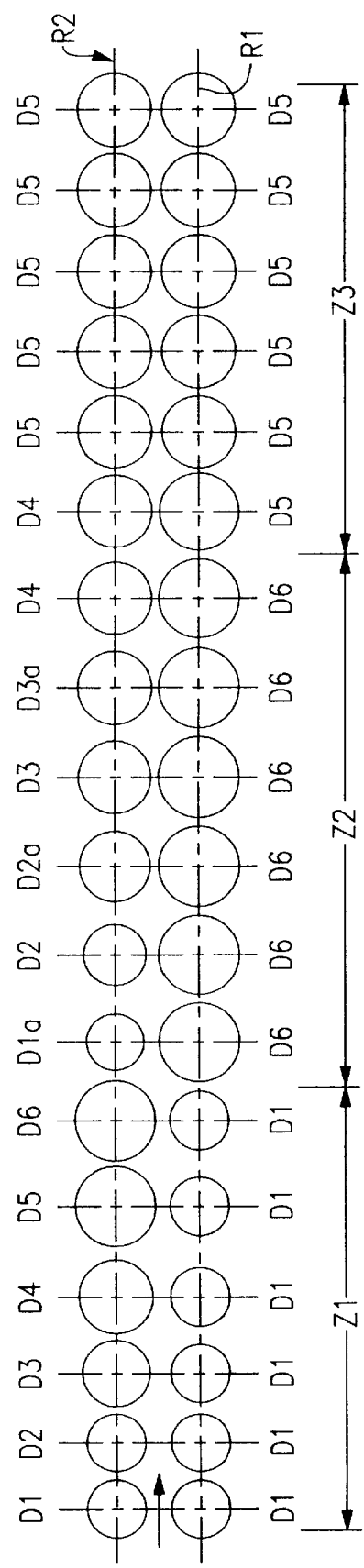
FIG. 1 is a purely schematic view showing the operating principle of the apparatus according to the invention.
Figure 2:
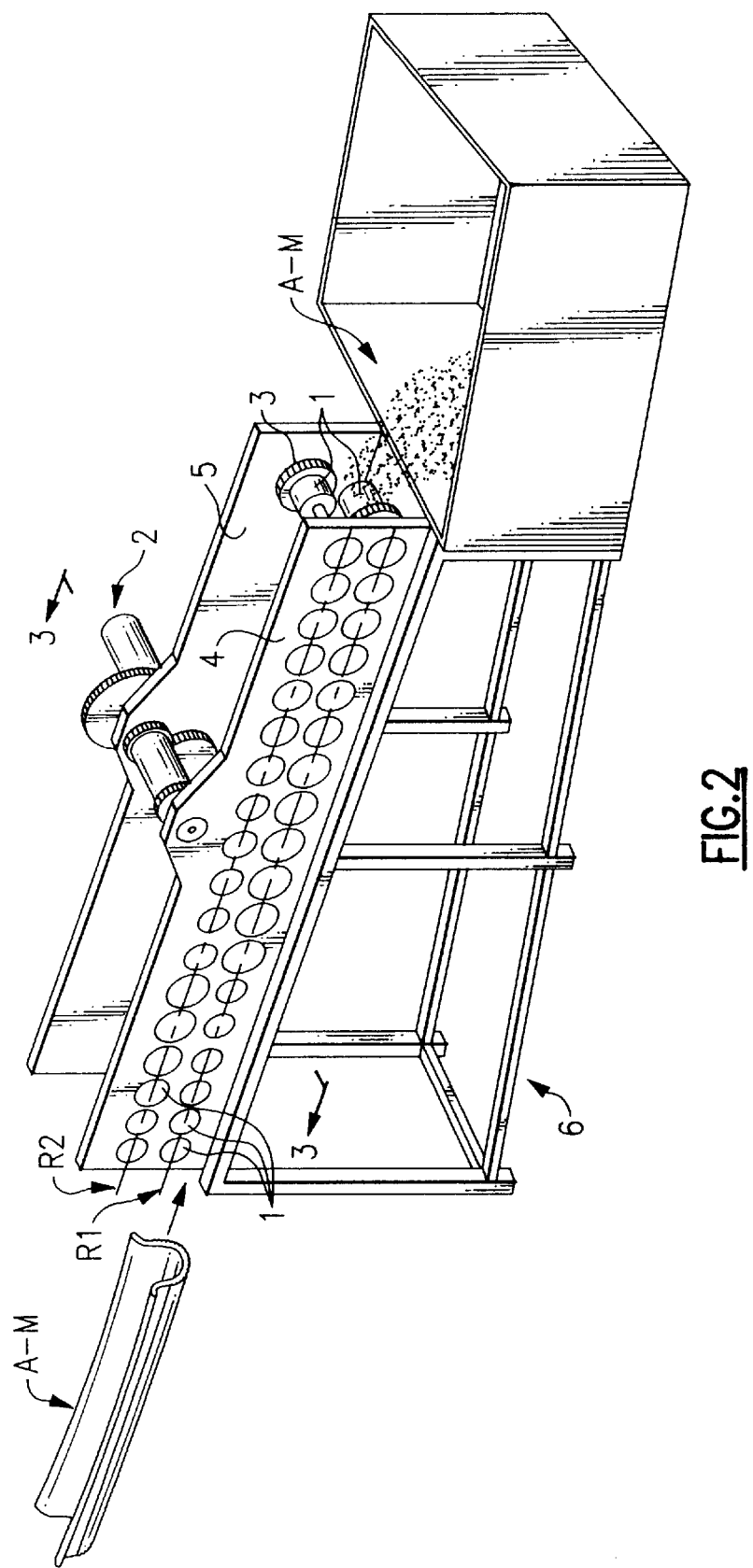
FIG. 2 is a perspective view of an embodiment of the apparatus.
Figure 3:
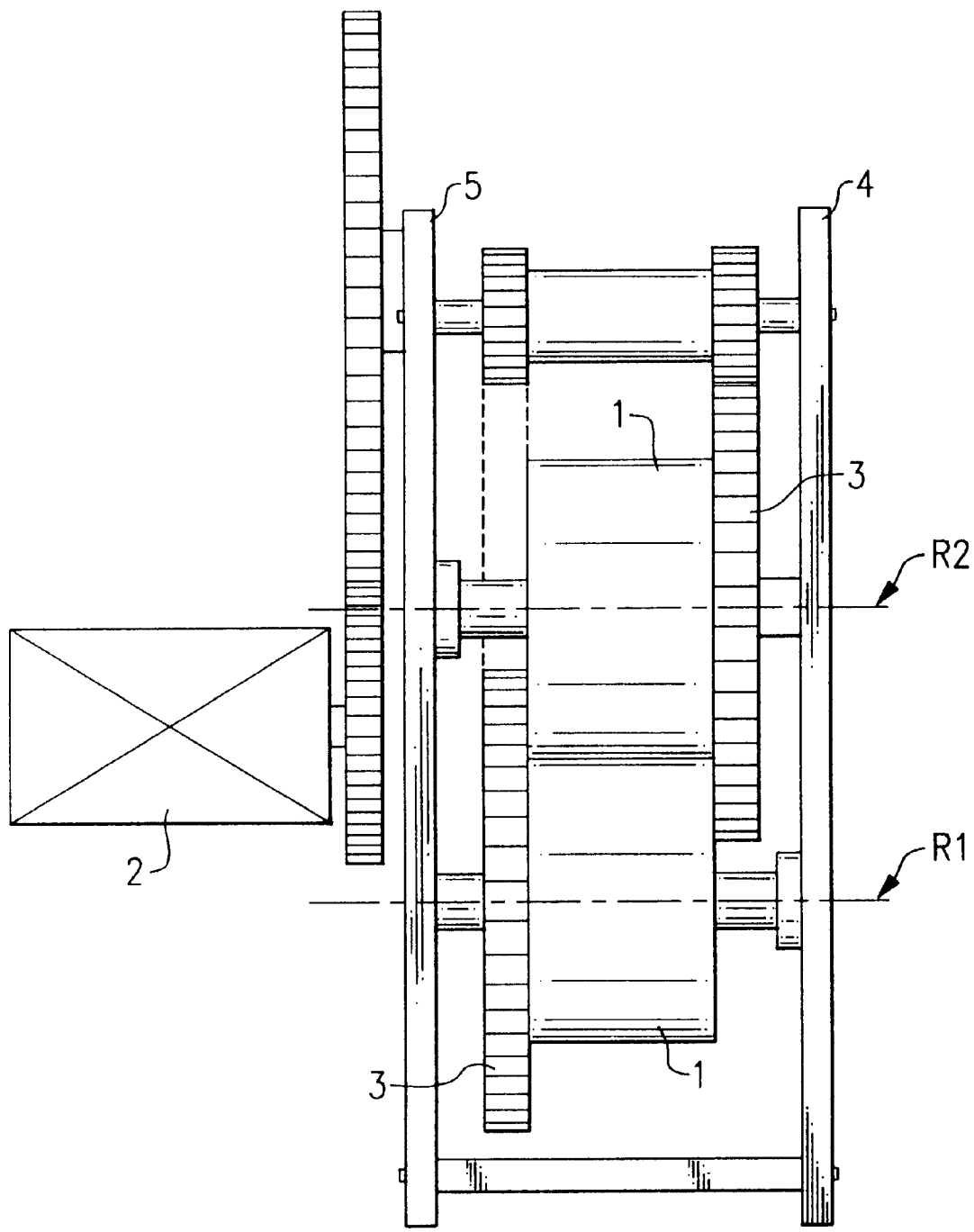
FIG. 3 is a cross sectional view along line 3.3 in FIG. 2.
Figure 4:
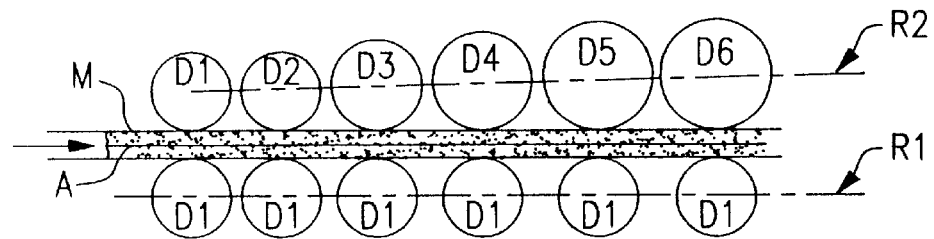
FIGS. 4, 5 and 6 are larger-scale sectional views showing the tire processing principle.
Figure 5:
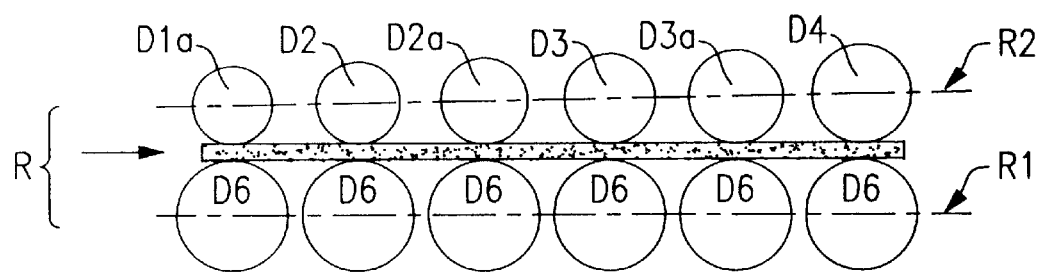
Figure 6:
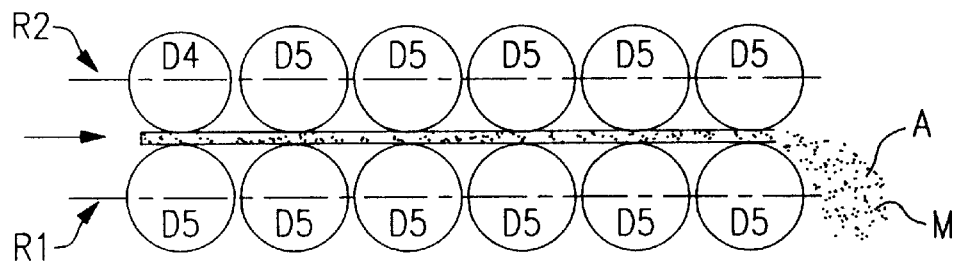

The rest of this description applies, by way of example only and in no way exhaustively, to the processing of a tire, but the reader is reminded that the invention has applications for the processing of any rubber or plastic-based articles which have integral metal and/or textile reinforcement.

The apparatus according to the invention is devised to process any type of tire comprising, in a perfectly well known manner, metal (and/or textile) reinforcement (A) embedded in a rubbery material (M). The object sought after is to be able to ensure continuous, successive loss of cohesion of the rubbery material (M) in order to separate it from metal reinforcement (A) and to obtain, at the outlet of the apparatus, a resulting powder consisting of a mixture of rubber and metal and/or textile particles.

In the embodiment shown, the apparatus comprises at least two rows (R1) and (R2) of rotating rollers (1) with parallel centerlines that are superposed two by two. The tires are fed in flat between the rows of rollers (1).

For this purpose, the tires are previously cut crosswise so that they can be spread apart and deployed in a line or be unfolded from the side walls. The rollers (1) in each row (R1) and (R2) are positively driven in the same direction of rotation but at different linear velocities.

These arrangements make it possible, in a perfectly well known manner, to transport the tyres by friction once they have been gripped between the rollers.

According to one basic aspect of the invention, the rollers (1) in each row (R1) and (R2) or in one of these two rows, are designed and/or controlled by any type of means in order to exert pressure on the tire combined with frictional movement by relative displacement between said tyre and said rollers in order, in particular, to produce loss of cohesion of the rubbery material (M) in order to separate it from the metal reinforcement (A).

For this purpose, it appeared advantageous to arrange the rollers as indicated above in three separate, continuous areas (Z1) (Z2) (Z3). Each area plays a part in achieving the desired results and corresponds to a particular function.

Area (Z1) ensures primary loss of cohesion of the rubbery material in order to detach it from metal reinforcement (A).

Area (Z2) ensures stripping of rubbery material (M) from reinforcement (A).

Area (Z3) ensures separation of the rubbery material (M) and metal reinforcement (A) in order to produce a resulting powder consisting of a mixture of rubber and steel.

In order to achieve this result, various solutions are feasible. The solution described below is especially satisfactory and relatively simple to implement.

The rollers (1) in each row are driven at the same angular velocity and in the same direction as already stated. This rotational drive may be obtained by any known appropriate means. For example, the rollers (1) are driven by one or more motors (2) combined with gear trains (3). Note that rotational driving of the rollers may also be controlled by a device of the inertia flywheel type in order to subject the tire to a high pressure force for an extremely short time interval.

In each area (Z1) (Z2) (Z3), the rollers have different diameters selected in order to fulfil the above-mentioned functions. The reader is referred to FIG. 1 in the drawings.

In the first area (Z1), the rollers (1) in the lower row (R1) all have the same diameter; (D1) is this diameter. The rollers in the upper row (R2) have gradually increasing diameters. The diameter of the first roller in the upper row is equal or substantially equal to the diameter (D1) of the rollers in the lower row. (D1) (D2) (D3) (D4) (D5) and (D6) are the diameters of the rollers (1) in upper row (R2).

In the second area (Z2), the rollers (1) in the lower row (R1) all have the same diameter (D6). This diameter (D6) is equal or substantially equal to the diameter of the last roller in the upper row in the first area (Z1). The rollers in the upper row (R2) have gradually increasing diameters. The diameter of the first roller in this upper row (D1a) is equal or substantially equal to the diameter (D1) of the first roller in the upper or lower row in the first area (Z1). (D1a) (D2) (D2a) (D3) (D3a) and (D4) are the diameters of the rollers (1) in the upper row (R2).

In the third area (Z3), the rollers (1) in the lower row (R1) all have the same diameter (D5). This diameter (D5) is very slightly smaller than the diameter (D6) of the rollers in the lower row (R1) in the second area (Z2). The rollers in the upper row (R2) have a diameter (D5) equal to that of the rollers in the lower row (R1) apart from the first roller of which the diameter (D4) equals that of the last roller in the upper row (R2) in area (Z2).

It is therefore apparent that the angular velocity of the various rollers is constant whereas the linear drive velocity is not constant given this selection of different diameters. This does not exclude the use of other means to obtain this difference in velocities capable of subjecting the tire to a pressure force combined with an alternating linear movement of displacement.

The various rollers (1) are mounted between two lateral guides (4) (5). In addition, the various rollers as defined are arranged in a substantially tangential layout in a very substantially vertical plane. This layout forces the tire to follow the linear path delimited by the rollers and prevents it from moving upwards between two successive rollers.

Figure 7:
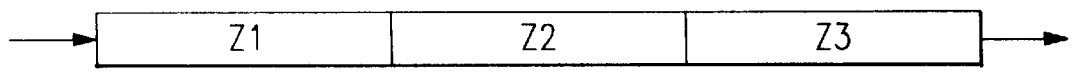
FIGS. 7, 8 and 9 are schematic views showing examples of possible apparatus geometries which are in no way exhaustive.
Figure 8:
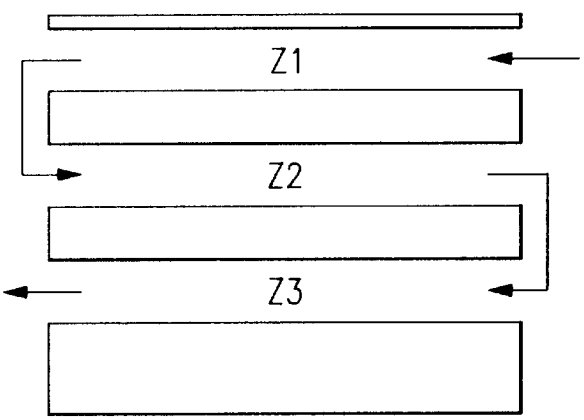
Figure 9:
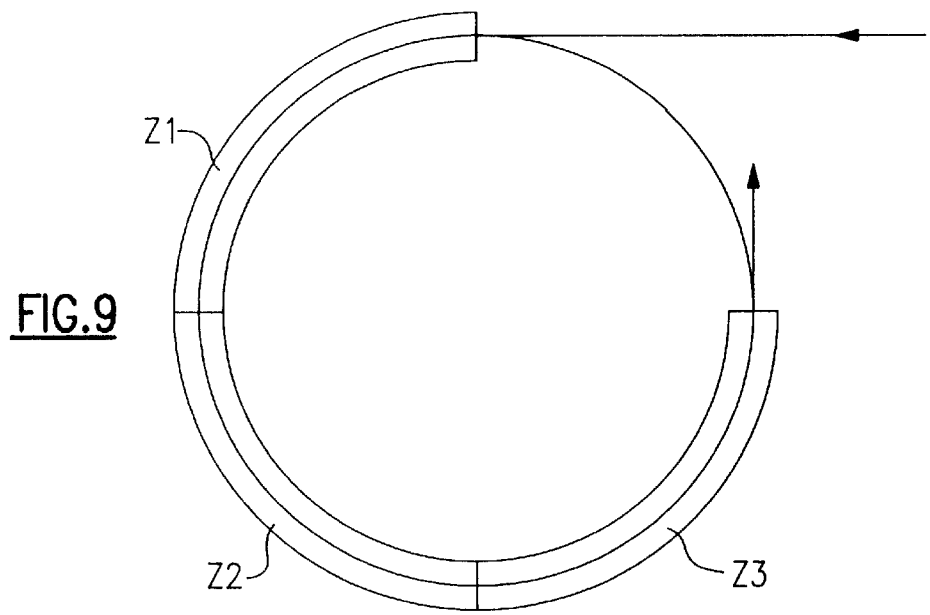

The entire apparatus as defined is installed on any type of support frame (6). Given the design of the apparatus and its operating principle, it can have various geometrical shapes. For instance, areas (Z1) (Z2) (Z3) may have a linear, superposed, side-by-side or circular configuration (FIGS. 7, 8 and 9).

At the outlet of the apparatus, i.e. at the outlet from area (Z3), the rubber and steel powder obtained is collected by any known appropriate means. In this respect, the powder may then be subjected to processes that are perfectly familiar to those skilled in the art and which make it possible to separate the rubber particles from the metal components. Similarly, the tires may be fed into area (Z1) either manually or automatically.

Note that the drive speeds of the rollers and the selected diameters are determined in order to minimise effects that cause temperature rises.

The advantages are clearly apparent from the description, the following points in particular being stressed and emphasised:

simple to produce, loss of cohesion of rubber is obtained by actually using the metal reinforcement of the rubber structure rather than by using a cutting tool, the apparatus works at ambient temperature and does not require any prior preparation of the tire, absence of wear, unlike a crusher, possibility of constructing mobile apparatus that can be transported to any site in order to process tires, operational reliability, effectiveness of the result obtained, no waste product to affect the environment, apparatus is self-contained, possibility of building relocatable apparatus.

What is claimed is:

1. An apparatus for the processing of tires having metal and/or textile reinforcement embedded in a rubbery material, said apparatus comprising:

at least two superposed rows of rotating rollers with parallel centerlines, wherein the rollers in the first row are positively driven in the same direction of rotation at different linear velocities and the rollers in the second row rotate in an opposite direction to the rollers in the first row in order to transport the articles by friction;

said rotating rollers delimited into first, second and third separate and continuous areas, said first area comprising:
- a first lower row of rollers of the same diameter, and
- a first upper row of rollers of gradually increasing diameters, wherein an initial roller of said first upper row has a diameter substantially equal to the diameters of the rollers in said first lower row;

said second area comprising:
- a second lower row of rollers having the same diameter which is substantially equal to the diameter of a last roller of said first upper row, and
- a second upper row of rollers having gradually increasing diameters, wherein a diameter of the first roller of said second upper row is substantially equal to the diameter of the first roller of said first upper row;

said third area comprising:
- a third lower row of rollers of the same diameter which is less than the diameter of the rollers in said second lower row, and
- a third upper row of rollers of the same diameter as those in said third lower row, except for a first roller of said third upper row having a diameter equal to the last roller of said second upper row, wherein the tires are fed in a flat configuration between said rows of rollers so that there is a continuous and successive loss of cohesion of the rubbery material in order to separate the rubbery material from the metal and/or textile reinforcement.

2. The apparatus as claimed in claim 1, wherein said rollers exert a pressure force on the tires and impart frictional movement to the tires by relative displacement between the tires and said rollers.

3. The apparatus as claimed in claim 1, wherein said rollers are driven at the same angular velocity.

4. The apparatus as claimed in claim 1, wherein said rollers are simultaneously driven in rotation by at least one motor in order to subject the tires to a pressure force during a short time interval.

5. The apparatus as claimed in claim 4, wherein said at least one motor is combined with an inertial flywheel device.

6. The apparatus as claimed in claim 1, wherein said rollers are mounted between two lateral guides in a substantially tangential layout in a substantially vertical plane.

* * * * *